United States Patent
Kanie

[19]

[11] Patent Number: 6,047,302
[45] Date of Patent: Apr. 4, 2000

[54] MEMORY STORING REDUNDANT BINARY CODES AND ARITHMETIC UNIT AND DISCRETE COSINE TRANSFORMER USING SUCH MEMORY

[75] Inventor: Youji Kanie, Nara, Japan

[73] Assignee: Sharp Kabushiki Kaisha, Osaka, Japan

[21] Appl. No.: 08/992,575

[22] Filed: Dec. 17, 1997

[30] Foreign Application Priority Data

Dec. 26, 1996 [JP] Japan ................................. 8-346897

[51] Int. Cl.[7] .............................. G06F 17/14; G06F 7/00
[52] U.S. Cl. ............................................. 708/402; 708/493
[58] Field of Search ................................ 708/400–402, 708/493; 341/50; 711/10

[56] References Cited

U.S. PATENT DOCUMENTS

| | | | |
|---|---|---|---|
| 4,866,655 | 9/1989 | Nishiyama et al. | 708/493 |
| 4,868,777 | 9/1989 | Nishiyama et al. | 708/493 |
| 5,673,214 | 9/1997 | Kim et al. | 708/402 |

FOREIGN PATENT DOCUMENTS 5210601  8/1993  Japan .

OTHER PUBLICATIONS

T. Taniguchi et al.; "A High–Speed Floating–Point Processor using Redundant Binary Representation"; Technical Report of IEICE, ICD87; (1987); pp. 43–48.

*Primary Examiner*—Tan V. Mai

[57] ABSTRACT

A memory, which consumes less electric power and has a longer life, stores a redundant binary code produced by replacing each digit of data in binary representation, with a separate 2-bit string allocated to a value which the digit can take. If a value to be output before or after a value is output from the memory is known, a redundant binary representation and a redundant binary code associated therewith are determined such that the number of transitions can be reduced. Thus, a memory which consumes less electric power and has a longer life can be provided.

9 Claims, 8 Drawing Sheets

FIG. 2

|  | −1 | 0 | 1 | NUMBER OF TRANSITIONS |
|---|---|---|---|---|
| DEF 1 | (1 0) | (0 0) | (1 1) | BETWEEN 0 AND 1 |
| DEF 2 | (1 1) | (0 0) | (0 1) | BETWEEN 1 AND 0 |
| DEF 3 | (1 0) | (0 0) | (0 1) | BETWEEN 1 AND −1 |

FIG. 3

| OUTPUT VALUE | BINARY REPRESENTATION | REDUNDANT BINARY REPRESENTATION |
|---|---|---|
| 0 | 0 0 0 0 0 | 0 0 0 0 0 0 |
| 31 | 1 1 1 1 1 | 1 0 0 0 0 −1 |
| NUMBER OF TRANSITIONS | 5 | 3 (DEF 1)<br>3 (DEF 2)<br>2 (DEF 3) |

FIG. 5

| 4-BIT STRING | COUNTER VALUE | | | | | | | |
|---|---|---|---|---|---|---|---|---|
| | a | b | c | d | e | f | g | h |
| (0 0 0 0) | 0 | 0 | 0 | 0 | 0 | 0 | 0 | 0 |
| (0 0 0 1) | 362 | -437 | 317 | -150 | 98 | -256 | 362 | -362 |
| (0 0 1 0) | 362 | -181 | -317 | 362 | 279 | -452 | 85 | 307 |
| (0 0 1 1) | 724 | -618 | 0 | 212 | 377 | -708 | 447 | -55 |
| (0 1 0 0) | 362 | 181 | -317 | -362 | 418 | -90 | -427 | -205 |
| (0 1 0 1) | 724 | -256 | 0 | -512 | 516 | -346 | -65 | -569 |
| (0 1 1 0) | 724 | 0 | -634 | 0 | 697 | -542 | -342 | 102 |
| (0 1 1 1) | 1086 | -437 | -317 | -150 | 795 | -798 | 20 | -260 |
| (1 0 0 0) | 362 | 437 | 317 | 150 | 493 | 383 | 242 | 72 |
| (1 0 0 1) | 724 | 0 | 634 | 0 | 591 | 127 | 604 | -290 |
| (1 0 1 0) | 724 | 256 | 0 | 512 | 772 | -69 | 327 | 379 |
| (1 0 1 1) | 1086 | -181 | 317 | 362 | 870 | -325 | 689 | 17 |
| (1 1 0 0) | 724 | 618 | 0 | -212 | 911 | 293 | -185 | -133 |
| (1 1 0 1) | 1086 | 181 | 317 | -362 | 1009 | 37 | 177 | -495 |
| (1 1 1 0) | 1086 | 437 | 317 | 150 | 1190 | -159 | -100 | 174 |
| (1 1 1 1) | 1448 | 0 | 0 | 0 | 1288 | -415 | 262 | -188 |

FIG. 6A

INPUT 4-BIT STRING: (0 1 0 1)

| COUNTER VALUE | OUTPUT VALUE | REDUNDANT BINARY REPRESENTATION | | | | | | | | | | | |
|---|---|---|---|---|---|---|---|---|---|---|---|---|---|
| a | 724 | 0 | 1 | 0 | -1 | 0 | 0 | -1 | 0 | -1 | -1 | 0 | 0 |
| b | -256 | 0 | 0 | 0 | -1 | 0 | 0 | 0 | 0 | 0 | 0 | 0 | 0 |
| c | 0 | 0 | 0 | 0 | 0 | 0 | 0 | 0 | 0 | 0 | 0 | 0 | 0 |
| d | -512 | 0 | 0 | -1 | 0 | 0 | 0 | 0 | 0 | 0 | 0 | 0 | 0 |
| NUMBER OF TRANSITIONS | | 0 | 1 | 1 | 1 | 0 | 0 | 1 | 0 | 1 | 1 | 0 | 0 | TOTAL 6 |

FIG. 6B

INPUT 4-BIT STRING: (0 0 1 1)

| COUNTER VALUE | OUTPUT VALUE | REDUNDANT BINARY REPRESENTATION | | | | | | | | | | | |
|---|---|---|---|---|---|---|---|---|---|---|---|---|---|
| e | 377 | 0 | 0 | 1 | 0 | -1 | 0 | 0 | 0 | 0 | -1 | -1 | -1 |
| f | -708 | 0 | -1 | 1 | 0 | -1 | -1 | 0 | 0 | 0 | -1 | 0 | 0 |
| g | 447 | 0 | 0 | 1 | 0 | 0 | -1 | 0 | 0 | 0 | 0 | 0 | -1 |
| h | -55 | 0 | 0 | 0 | 0 | 0 | -1 | 0 | 0 | 1 | 0 | 1 | -1 |
| NUMBER OF TRANSITIONS | | 0 | 2 | 1 | 0 | 1 | 1 | 0 | 0 | 1 | 1 | 2 | 2 | TOTAL 11 |

FIG. 6C

INPUT 4-BIT STRING: COUNTER VALUE OF d (0 1 0 1)
COUNTER VALUE OF e (0 0 1 1)

| COUNTER VALUE | OUTPUT VALUE | REDUNDANT BINARY REPRESENTATION | | | | | | | | | | | |
|---|---|---|---|---|---|---|---|---|---|---|---|---|---|
| d | -512 | 0 | 0 | -1 | 0 | 0 | 0 | 0 | 0 | 0 | 0 | 0 | 0 |
| e | 377 | 0 | 0 | 1 | 0 | -1 | 0 | 0 | 0 | 0 | -1 | -1 | -1 |
| NUMBER OF TRANSITIONS | | 0 | 0 | 2 | 0 | 1 | 0 | 0 | 0 | 0 | 1 | 1 | 1 | TOTAL 6 |

TOTAL NUMBER OF TRANSITIONS = 6+11+6 = 23

FIG. 7A

INPUT 4-BIT STRING: (0 1 0 1)

| COUNTER VALUE | DECIMAL REPRESENTATION | BINARY REPRESENTATION | | | | | | | | | | | |
|---|---|---|---|---|---|---|---|---|---|---|---|---|---|
| a | 724 | 0 | 0 | 1 | 0 | 1 | 1 | 0 | 1 | 0 | 1 | 0 | 0 |
| b | −256 | 1 | 1 | 1 | 1 | 0 | 0 | 0 | 0 | 0 | 0 | 0 | 0 |
| c | 0 | 0 | 0 | 0 | 0 | 0 | 0 | 0 | 0 | 0 | 0 | 0 | 0 |
| d | −512 | 1 | 1 | 1 | 0 | 0 | 0 | 0 | 0 | 0 | 0 | 0 | 0 | TOTAL |
| NUMBER OF TRANSITIONS | | 3 | 3 | 2 | 2 | 1 | 1 | 0 | 1 | 0 | 1 | 0 | 0 | 14 |

FIG. 7B

INPUT 4-BIT STRING: (0 0 1 1)

| COUNTER VALUE | DECIMAL REPRESENTATION | BINARY REPRESENTATION | | | | | | | | | | | |
|---|---|---|---|---|---|---|---|---|---|---|---|---|---|
| e | 377 | 0 | 0 | 0 | 1 | 0 | 1 | 1 | 1 | 1 | 0 | 0 | 1 |
| f | −708 | 1 | 1 | 0 | 1 | 0 | 0 | 1 | 1 | 1 | 1 | 0 | 0 |
| g | 447 | 0 | 0 | 0 | 1 | 1 | 0 | 1 | 1 | 1 | 1 | 1 | 1 |
| h | −55 | 1 | 1 | 1 | 1 | 1 | 1 | 0 | 0 | 1 | 0 | 0 | 1 | TOTAL |
| NUMBER OF TRANSITIONS | | 3 | 3 | 1 | 0 | 1 | 2 | 1 | 1 | 0 | 2 | 2 | 2 | 18 |

FIG. 7C

INPUT 4-BIT STRING: COUNTER VALUE OF d (0 1 0 1)
COUNTER VALUE OF e (0 0 1 1)

| COUNTER VALUE | OUTPUT VALUE | BINARY REPRESENTATION | | | | | | | | | | | |
|---|---|---|---|---|---|---|---|---|---|---|---|---|---|
| d | −512 | 1 | 1 | 1 | 0 | 0 | 0 | 0 | 0 | 0 | 0 | 0 | 0 |
| e | 377 | 0 | 0 | 0 | 1 | 0 | 1 | 1 | 1 | 1 | 0 | 0 | 1 | TOTAL |
| NUMBER OF TRANSITIONS | | 1 | 1 | 1 | 1 | 0 | 1 | 1 | 1 | 1 | 0 | 0 | 1 | 9 |

TOTAL NUMBER OF TRANSITIONS = 14+18+9 = 41

FIG. 8

| INPUT 4-BIT STRING FOR COUNTER VALUE OF a,b,c,d | INPUT 4-BIT STRING FOR COUNTER VALUE OF e,f,g,h | 0000 | 0001 | 0010 | 0011 | 0100 | 0101 | 0110 | 0111 | 1000 | 1001 | 1010 | 1011 | 1100 | 1101 | 1110 | 1111 | TOTAL |
|---|---|---|---|---|---|---|---|---|---|---|---|---|---|---|---|---|---|---|
| | NUMBER OF TRANSITIONS | 0 | 14 | 12 | 11 | 9 | 13 | 12 | 14 | 12 | 10 | 12 | 12 | 10 | 10 | 12 | 15 | 180 |
| 0000 | | 0 | 3 | 5 | 5 | 4 | 2 | 6 | 6 | 4 | 4 | 4 | 4 | 6 | 3 | 5 | 15 | |
| 0001 | | 4 | 7 | 9 | 3 | 6 | 6 | 10 | 6 | 10 | 6 | 6 | 8 | 10 | 5 | 9 | 3 | |
| 0010 | | 6 | 7 | 9 | 9 | 4 | 6 | 6 | 10 | 4 | 10 | 6 | 11 | 4 | 9 | 7 | 7 | |
| 0011 | | 4 | 5 | 5 | 9 | 8 | 6 | 10 | 8 | 8 | 6 | 6 | 5 | 6 | 5 | 7 | 7 | |
| 0100 | | 5 | 6 | 10 | 8 | 5 | 4 | 9 | 9 | 6 | 9 | 6 | 10 | 8 | 8 | 7 | 5 | |
| 0101 | | 1 | 4 | 6 | 6 | 4 | 5 | 7 | 7 | 9 | 7 | 9 | 5 | 7 | 4 | 6 | 8 | |
| 0110 | | 0 | 3 | 5 | 5 | 3 | 3 | 6 | 6 | 5 | 5 | 5 | 10 | 6 | 3 | 5 | 4 | |
| 0111 | | 6 | 7 | 11 | 8 | 5 | 2 | 8 | 6 | 4 | 4 | 4 | 4 | 8 | 9 | 9 | 3 | |
| 1000 | | 5 | 6 | 8 | 5 | 6 | 8 | 9 | 7 | 6 | 6 | 6 | 7 | 5 | 8 | 7 | 5 | |
| 1001 | | 0 | 3 | 5 | 4 | 3 | 5 | 6 | 6 | 5 | 7 | 9 | 4 | 9 | 5 | 6 | 6 | |
| 1010 | | 1 | 4 | 6 | 6 | 5 | 6 | 9 | 5 | 9 | 4 | 8 | 3 | 8 | 4 | 10 | 4 | |
| 1011 | | 5 | 8 | 10 | 2 | 6 | 7 | 6 | 9 | 3 | 5 | 5 | 7 | 5 | 6 | 6 | 8 | |
| 1100 | | 4 | 7 | 6 | 5 | 9 | 4 | 8 | 10 | 6 | 9 | 6 | 9 | 6 | 8 | 10 | 7 | |
| 1101 | | 5 | 6 | 9 | 8 | 6 | 2 | 9 | 9 | 7 | 10 | 9 | 11 | 8 | 5 | 3 | 8 | |
| 1110 | | 4 | 3 | 6 | 9 | 9 | 4 | 6 | 8 | 8 | 6 | 8 | 8 | 5 | 8 | 3 | 7 | |
| 1111 | | 0 | 3 | 5 | 5 | 4 | 2 | 6 | 6 | 4 | 4 | 4 | 5 | 6 | 3 | 5 | 3 | |
| TOTAL | | | | | | | | | | | | | | | | | | 166 | 1574 |

TOTAL OF TOTAL NUMBERS OF TRANSITIONS = 166×16 + 180×16 + 1574 = 7110

AVERAGE TOTAL TRANSITION NUMBER = 7110 ÷ 256 ≒ 27.77

FIG. 9

| INPUT 4-BIT STRING FOR COUNTER VALUE OF a,b,c,d | NUMBER OF TRANSITIONS | INPUT 4-BIT STRING FOR COUNTER VALUE OF e,f,g,h | | | | | | | | | | | | | | | | TOTAL |
|---|---|---|---|---|---|---|---|---|---|---|---|---|---|---|---|---|---|---|
| | | 0000 | 0001 | 0010 | 0011 | 0100 | 0101 | 0110 | 0111 | 1000 | 1001 | 1010 | 1011 | 1100 | 1101 | 1110 | 1111 | |
| | NUMBER OF TRANSITIONS | 0 | 24 | 20 | 18 | 16 | 15 | 20 | 25 | 13 | 11 | 22 | 16 | 15 | 14 | 22 | 21 | 272 |
| 0000 | 0 | 0 | 3 | 5 | 6 | 4 | 2 | 6 | 6 | 7 | 6 | 3 | 6 | 7 | 7 | 5 | 3 | |
| 0001 | 23 | 8 | 5 | 9 | 6 | 6 | 8 | 8 | 6 | 7 | 6 | 7 | 4 | 7 | 7 | 7 | 5 | |
| 0010 | 16 | 5 | 2 | 6 | 3 | 6 | 7 | 7 | 5 | 4 | 5 | 6 | 3 | 6 | 6 | 6 | 4 | |
| 0011 | 17 | 4 | 5 | 5 | 6 | 3 | 4 | 6 | 8 | 5 | 6 | 5 | 5 | 7 | 6 | 5 | 7 | |
| 0100 | 20 | 7 | 8 | 6 | 11 | 6 | 5 | 7 | 7 | 10 | 7 | 6 | 7 | 6 | 5 | 4 | 8 | |
| 0101 | 14 | 3 | 6 | 8 | 9 | 7 | 3 | 7 | 7 | 10 | 7 | 4 | 6 | 8 | 8 | 6 | 4 | |
| 0110 | 17 | 0 | 3 | 5 | 6 | 7 | 2 | 6 | 7 | 7 | 6 | 3 | 4 | 8 | 8 | 5 | 3 | |
| 0111 | 14 | 8 | 5 | 9 | 6 | 4 | 8 | 8 | 6 | 7 | 6 | 7 | 6 | 7 | 7 | 7 | 5 | |
| 1000 | 15 | 4 | 5 | 3 | 8 | 6 | 4 | 6 | 6 | 8 | 6 | 5 | 5 | 7 | 7 | 3 | 7 | |
| 1001 | 17 | 0 | 1 | 5 | 6 | 4 | 2 | 6 | 6 | 4 | 5 | 3 | 3 | 5 | 7 | 5 | 3 | |
| 1010 | 8 | 1 | 4 | 6 | 7 | 4 | 1 | 5 | 5 | 7 | 7 | 2 | 5 | 6 | 7 | 6 | 4 | |
| 1011 | 21 | 5 | 2 | 6 | 3 | 5 | 7 | 7 | 5 | 6 | 7 | 6 | 6 | 6 | 6 | 6 | 4 | |
| 1100 | 18 | 7 | 8 | 8 | 7 | 3 | 5 | 7 | 7 | 10 | 6 | 4 | 7 | 6 | 6 | 6 | 4 | |
| 1101 | 17 | 7 | 8 | 6 | 11 | 7 | 5 | 7 | 7 | 7 | 6 | 6 | 7 | 6 | 8 | 4 | 8 | |
| 1110 | 22 | 4 | 5 | 3 | 8 | 7 | 4 | 6 | 6 | 7 | 7 | 5 | 6 | 5 | 7 | 3 | 7 | |
| 1111 | 5 | 0 | 3 | 5 | 6 | 4 | 2 | 6 | 6 | 7 | 6 | 3 | 5 | 7 | 7 | 5 | 3 | |
| TOTAL | 244 | | | | | | | | | | | | | | | | | 1442 |

TOTAL OF TOTAL NUMBER OF TRANSITIONS = 244×16 + 272×16 + 1442 = 9698

AVERAGE TOTAL TRANSITION NUMBER = 9698 ÷ 256 ≒ 37.88

MEMORY STORING REDUNDANT BINARY CODES AND ARITHMETIC UNIT AND DISCRETE COSINE TRANSFORMER USING SUCH MEMORY

BACKGROUND OF THE INVENTION

1. Field of the Invention

The present invention relates generally to memories storing redundant binary codes, an arithmetic unit and a discrete cosine transformer using such a memory. The invention particularly relates to a memory permitting power consumption to be reduced, and an arithmetic unit and a discrete cosine transformer using such a memory.

2. Description of the Related Art

Referring to FIG. 1, in an arithmetic unit, a general arithmetic operation portion 100 performs an operation based on a received input X and output data from a memory 200 and produces an output X.

The output value of memory 200 is represented in binary notation. If, for example, the bit number of the output value of memory 200 is 12, an output value of 724 is output as 001011010100, the binary representation of 724. A negative output value of −256 is output as 111100000000, the 2' complement of the corresponding absolute number.

As input X changes or an input subject to an arithmetic operation at arithmetic operation portion 100 changes, the output data of memory 200 necessarily changes. As described above, since the output data of memory 200 is in binary notation, the number of changes in bits in the output data of the memory (hereinafter referred to as "transition number") is large. This leads to increased power consumption. This also promotes wear-out in the arithmetic unit, resulting in a shorter life of the unit.

SUMMARY OF THE INVENTION

It is therefore an object of the invention to provide a memory consuming less electric power and having a longer life.

An other object of the invention is to provide an arithmetic unit consuming less electric power and having a longer life.

Yet another object of the invention is to provide a discrete cosine transformer consuming less electric power and having a longer life.

A memory according to an aspect of the invention includes a redundant binary code memory for storing a redundant binary code obtained by replacing each digit of redundant binary data with a separate multi-bit string allocated to a value which the digit of the data can take, and a redundant binary code output unit for outputting a redundant binary code based on input data.

According to the invention, there are a plurality of redundant binary representations for data. As will be described, if a value output at least before or after each data output from the memory is determined and a redundant binary representation and a redundant binary code associated therewith are appropriately selected, the number of transitions may be reduced. Therefore, as compared to a conventional memory which outputs a value in binary representation, the number of transitions may be reduced. The electric power consumed by the memory may be reduced and the life of the memory may be prolonged. Among data output from the memory, if a value output at least before or after a certain piece of data is determined, the above-described function and effects can be provided.

An arithmetic unit according to another aspect of the invention includes a memory and a circuit for performing a prescribed operation to an output value received from the memory. The memory includes a redundant binary code memory for storing a redundant binary code obtained by replacing each digit of redundant binary data with a plurality of different bit strings allocated to values which each digit of the data can take, and a redundant binary code output unit for outputting a redundant binary code based on input data.

According to the present invention, there are a plurality of redundant binary representations for arbitrary data. Therefore, as will be described, if a value output at least before or after each data output from the memory is determined and a redundant binary representation and a redundant binary code associated therewith are appropriately selected, the number of transitions may be reduced. Therefore, as compared to a conventional memory which outputs a value in binary representation, the number of transitions may be reduced. As a result, the electric power consumed by the memory may be reduced and the life of the memory may be prolonged. Furthermore, the power consumption by the entire arithmetic unit using the memory may be reduced, and the life of the arithmetic unit may be prolonged as well. In addition, among data output from the memory, if a value output at least before or after a certain piece of the data is determined, the above-described function and effects may be provided.

A discrete cosine transformer according to yet another aspect of the invention includes a counter for sequentially generating a selecting signal for a discrete cosine transformation coefficient, an adder/subtracter for producing a plurality of added/subtracted values based on the received output of the counter and a plurality of received data items according to a prescribed rule and outputting a plurality of bit strings formed of the bits at the same position of the plurality of added/subtracted values, a plurality of memories each receiving the output of the counter and respectively receiving the plurality of bit strings output from the adder/subtracter for respectively outputting a plurality of partial sums of redundant binary codes, and an adder connected to the plurality of memories for shifting each of the plurality of received partial sums by a prescribed number of bits and then adding them up. The plurality of memories each include a redundant binary code memory for storing a redundant binary code obtained by replacing each digit of redundant binary data with a plurality of different bit strings allocated to values which can be taken by each digit of the data, and a redundant binary code output unit for outputting a redundant binary code based on outputs received from the counter and the adder/subtracter.

According to the present invention, there are a plurality of redundant binary representations for arbitrary data. Therefore, as will be described, if a value output at least before or after each data output from the memory is determined and a redundant binary representation and a redundant binary code associated therewith are appropriately selected, the number of transitions may be reduced. As a result, as compared to a conventional memory which outputs a value in binary representation, the number of transitions may be reduced. Therefore, the power consumption by the memory may be reduced and the life of the memory may be prolonged. In addition, the power consumption by the entire discrete cosine transformer using the memory may be reduced and the life of the discrete cosine transformer may be prolonged as well. If among data output from the memory, a value output at least before or after a certain piece of data is determined, the above function and effects may be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table showing three methods of encoding a redundant binary representation by a 2-bit string by way of illustration;

FIG. 3 is a table showing the number of transitions each for the case of outputting in a binary representation and the case of outputting in a redundant binary representation, when the output value changes from 0 to 31;

FIG. 5 is a table showing the output values of memories 3-1, 3-2, . . . , and 3-11;

FIG. 6A is a table showing the number of transitions in a single memory as the counter value changes according to the order of a, b, c, and d when an input 4-bit string is (0101) for counter values of a, b, c and d;

FIG. 6B is a table showing the number of transitions in a single memory as the counter value changes according to the order of e, f, g, and h when an input 4-bit string is (0011) for counter values of e, f, g, and h;

FIG. 6C is a table showing the number of transitions in a single memory as the counter value changes from d to e, when an input 4-bit string is (0101) for counter values of a, b, c and d and an input 4-bit string is (0011) for counter values of e, f, g and h;

FIG. 7A is a table showing the number of transitions in a single memory as the counter value changes according to the order of a, b, c, and d when a memory outputs a value in binary representation and an input 4-bit string is (0101) for counter values of a, b, c and d;

FIG. 7B is a table showing the number of transitions in a single memory as the counter value changes according to the order of e, f, g, and h, when the memory outputs a value in binary notation and an input 4-bit string is (0011) for counter values of e, f, g and h;

FIG. 7C is a table showing the number of transitions in a single memory as the counter value changes from d to e, when the memory outputs a value in binary representation, an input 4-bit string is (0101) for counter values of a, b, c and d, and an input 4-bit string is (0011) for counter values of e, f, g and h;

FIG. 8 is a table showing the numbers of transitions for all the input 4-bit strings each in a single memory as the counter value changes according to the order of a, b, c and d, the order of e, f, g, and h and from d to e; and FIG. 9 is a table showing the numbers of transitions for all the input 4-bit strings each in a single memory as the counter value changes according to the order of a, b, c, and d, the order of e, f, g, and h from d to e.

DESCRIPTION OF THE PREFERRED EMBODIMENTS

Figure 1:
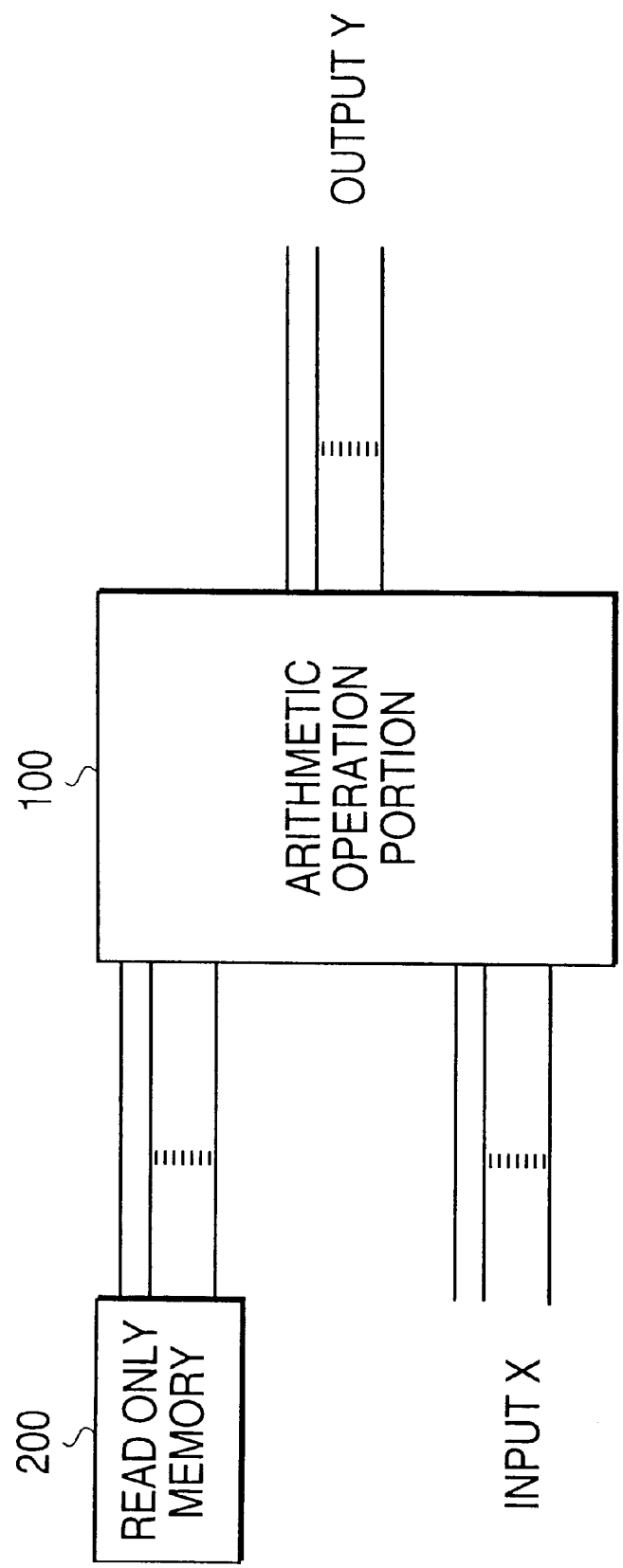
FIG. 1 is a block diagram showing an arithmetic unit using data output from a memory in the process of an arithmetic operation by way of illustration.

Embodiments of the invention will be now described in conjunction with the accompanying drawings. A memory according to one embodiment of the invention stores a bit string obtained by replacing each digit of a redundant binary representation of an output value with a separate 2-bit string allocated to a value which the digit in the redundant binary representation can take, and outputs the value. (Hereinafter the process of replacing each digit in a redundant binary representation with a separate x-bit string allocated to a value of the digit in the redundant binary representation can take is referred to as "encoding the redundant binary representation with x-bit string", and the bit string obtained by encoding the redundant binary representation by the x-bit string is referred to as "redundant binary code".)

Herein, the redundant binary representation is a numerical value represented using 2 as a fixed base and three numbers, −1, 0 and 1. More specifically, between a redundant binary representation and a binary representation, the weight of each digit is the same (i.e.,2), and corresponding digits may take different values (two numbers, 0 and 1 in the binary representation, while three numbers, −1, 0 and 1 in the redundant binary representation). In the redundant binary representation, there are a number of ways of representing a single numerical value. More specifically, in the redundant binary representation of five digits, a numerical value 1 may be represented as "00001", "0001-1", "001-1-1", "01-1-1-1", and "1-1-1-1-1".

The value which each digit in a redundant binary representation may take is one of three numbers, −1, 0 and 1. Meanwhile there are four kinds of 2-bit strings, (00), (01), (10), and (11).

Therefore, there are $_4P_3$=24 ways of encoding a redundant binary representation by a 2-bit string. Now, the number of transitions (the number of changes in bits) is focus. In each digit in a redundant binary representation, there may be three changes between −1 and 0, 0 and 1, and 1 and −1. If different 2-bit strings are allocated to −1, 0 and 1, the number of transitions in any of the above three changes becomes 2 regardless of the way of allocation (the allocated 2 bits both change), and the number of transitions in the remaining two changes is 1 (only one of the allocated two bits changes.) Therefore, there are three methods of encoding a redundant binary representation by a 2-bit string, in other words the number of transitions is set 2 each during the change between −1 and 0, between 0 and 1, and between 1 and −1.

Referring to FIG. 2, each example of these three methods will be described. In FIG. 2, as definition 1, (10), (00), and (11) are allocated to −1, 0, and 1, respectively. As definition 2, (11), (00), and (01) are allocated to −1, 0, and 1, respectively. As definition 3, (10), (00), and (01) are allocated to −1, 0, and 1, respectively. The number of transitions is 2 each during the change between 0 and 1 according to definition 1, during the change between −1 and 0 according to definition 2, and during the change between −1 and 1 according to definition 3.

In a memory which outputs values in a determined order or outputs only restricted values, in other words if the memory is not completely free, outputting a value in a redundant binary code may reduce the number of transitions rather than outputting a value in a binary representation. This is because in redundant binary representation, there are a plurality of representations for a single numerical value as described above. Therefore, if an output value to be output before or after the output value of the memory is determined, the way of representing the output value may be appropriately selected based on the output value to be output before or after each output value in order to reduce the number of transitions.

This will be more specifically described by referring to an example. Referring to FIG. 3, let us now assume that the output value of the memory changes from 0 to 31. In binary representation, 0 is "00000", and 31 is "11111". Therefore, if the output data of the memory is in binary representation, the number of transitions is 5. Meanwhile, in redundant binary representation, if the number of digits is 6, 0 is represented as "000000", and 31 can be represented as "011111", "1-11111", "10-1111", "100-111", "1000-11", or "10000-1". Let us now assume that "10000-1" is selected as a redundant binary representation of 31. The number of changes in digits in redundant binary representation, there are one change between −1 and 0, and another change between 0 and 1. Therefore, if the output data of the memory is produced by encoding a redundant binary representation by a 2-bit string (redundant binary code), in the method of encoding the redundant binary representation, the number of transitions is 3 according to definition 1 in FIGS. 2, 3 according to definition 2 in FIG. 2, and 2 according to definition 3 in FIG. 2.

In view of the foregoing, in the memory according to this embodiment, if an output value to be output at least before or after each output value is determined, the number of transitions may be reduced as compared to a memory which outputs a value in binary representation. The power consumption by the memory may be reduced, and the life of the arithmetic operation portion using the output data of the memory may be prolonged. By a memory outputting a determined value at least before or after a certain output value, the above-described function and effects may be provided.

Now, an arithmetic unit according to another embodiment of the invention using the above-described memory will be described. Note that an arithmetic unit using the output data of such a memory in the process of operation includes a constant adder, a constant multiplier, a multiplier accumulator for constants/coefficients, a matrix arithmetic unit having a fixed coefficient, a digital comparator, a discrete cosine transformer which is an application of the matrix arithmetic unit, and various other forms. The discrete cosine transformer will be described by way of illustration.

Discrete cosine transformation will be now described. A discrete cosine transform for eight pieces of one-dimensional n-bit data $X_1, X_2, \ldots,$ and $X_8$ is represented as the following expression (1). Eight pieces of data $Y_1, Y_2, \ldots,$ and $Y_8$ resulting from the transformation are referred to as discrete cosine transformation coefficients.

$$\begin{bmatrix} Y_1 \\ Y_2 \\ Y_3 \\ Y_4 \\ Y_5 \\ Y_6 \\ Y_7 \\ Y_8 \end{bmatrix} = \frac{1}{2} \begin{bmatrix} W_1C_4 & W_1C_4 & W_1C_4 & W_1C_4 & W_1C_4 & W_1C_4 & W_1C_4 & W_1C_4 \\ W_2C_1 & W_2C_3 & W_2C_5 & W_2C_7 & -W_2C_7 & -W_2C_5 & -W_2C_3 & -W_2C_1 \\ W_3C_2 & W_3C_6 & -W_3C_6 & -W_3C_2 & -W_3C_2 & -W_3C_6 & W_3C_6 & W_3C_2 \\ W_4C_3 & -W_4C_7 & -W_4C_1 & -W_4C_5 & W_4C_5 & W_4C_1 & W_4C_7 & -W_4C_3 \\ W_5C_4 & -W_5C_4 & -W_5C_4 & W_5C_4 & W_5C_4 & -W_5C_4 & -W_5C_4 & W_5C_4 \\ W_6C_5 & -W_6C_1 & W_6C_7 & W_6C_3 & -W_6C_3 & -W_6C_7 & W_6C_1 & -W_6C_5 \\ W_7C_6 & -W_7C_2 & W_7C_2 & -W_7C_6 & -W_7C_6 & W_7C_2 & -W_7C_2 & W_7C_6 \\ W_8C_7 & -W_8C_5 & W_8C_3 & -W_8C_1 & W_8C_1 & -W_8C_3 & W_8C_5 & -W_8C_7 \end{bmatrix} \begin{bmatrix} X_1 \\ X_2 \\ X_3 \\ X_4 \\ X_5 \\ X_6 \\ X_7 \\ X_8 \end{bmatrix} \quad (1)$$

wherein $C_P = \cos(p\pi/16)$ $(p=1\sim7)$ $W_1=1$ $W_2=C_4/4C_7C_2$ $W_3=C_4/2C_6$ $W_4=C_4/2C_5$ $W_5=7/8$ $W_6=C_4/C_3$ $W_7=C_4/C_2$ $W_8=C_4/C_1$ Expression (1) is modified to obtain the following expressions (2a) and (2b).

$$\begin{bmatrix} Y_1 \\ Y_3 \\ Y_5 \\ Y_7 \end{bmatrix} = \frac{1}{2} \begin{bmatrix} W_1C_4 & W_1C_4 & W_1C_4 & W_1C_4 \\ W_3C_2 & W_3C_6 & -W_3C_6 & -W_3C_2 \\ W_5C_4 & -W_5C_4 & -W_5C_4 & W_5C_4 \\ W_7C_6 & -W_7C_2 & W_7C_2 & -W_7C_6 \end{bmatrix} \begin{bmatrix} X_1 + X_8 \\ X_2 + X_7 \\ X_3 + X_6 \\ X_4 + X_5 \end{bmatrix} \quad (2a)$$

$$\begin{bmatrix} Y_2 \\ Y_4 \\ Y_6 \\ Y_8 \end{bmatrix} = \frac{1}{2} \begin{bmatrix} W_2C_1 & W_2C_3 & W_2C_5 & W_2C_7 \\ W_4C_3 & -W_4C_7 & -W_4C_1 & -W_4C_5 \\ W_6C_5 & -W_6C_1 & W_6C_7 & W_6C_3 \\ W_8C_7 & -W_8C_5 & W_8C_3 & -W_8C_1 \end{bmatrix} \begin{bmatrix} X_1 - X_8 \\ X_2 - X_7 \\ X_3 - X_6 \\ X_4 - X_5 \end{bmatrix} \quad (2b)$$

To make the coefficients of expressions (2a) and (2b) into integers, the coefficients are multiplied by $2^9$ followed by omission of decimals, and the following expressions (3a) and (3b) result.

$$\begin{bmatrix} Y_1 \\ Y_3 \\ Y_5 \\ Y_7 \end{bmatrix} = \begin{bmatrix} 362 & 362 & 362 & 362 \\ 437 & 181 & -181 & -437 \\ 317 & -317 & -317 & 317 \\ 150 & -362 & 362 & -150 \end{bmatrix} \begin{bmatrix} X_1 + X_8 \\ X_2 + X_7 \\ X_3 + X_6 \\ X_4 + X_5 \end{bmatrix} \quad (3a)$$

$$\begin{bmatrix} Y_2 \\ Y_4 \\ Y_6 \\ Y_8 \end{bmatrix} = \begin{bmatrix} 493 & 418 & 279 & 98 \\ 383 & -90 & -452 & -256 \\ 242 & -427 & 85 & 362 \\ 72 & -205 & 307 & -362 \end{bmatrix} \begin{bmatrix} X_1 - X_8 \\ X_2 - X_7 \\ X_3 - X_6 \\ X_4 - X_5 \end{bmatrix} \quad (3a)$$

From expressions (3a) and (3b), $Y_j$ (j=1, 2, ..., 8) is represented by the following expression (4).

$$Y_j = T_1Z_1 + T_2Z_2 + T_3Z_3 + T_4Z_4 \; (j=1, 2, \ldots, 8) \quad (4)$$

wherein for j=1, 3, 5, 7, $Z_1=X_1+X_8$, $Z_2=X_2+X_7$, $Z_3=X_3+X_6$, $Z_4=X_4+X_5$, for j=2, 4, 6, 8, $Z_1=X_1-X_8$, $Z_2=X_2-X_7$, $Z_3=X_3-X_6$, $Z_4=X_4-X_5$, for j=1, $T_1=362$, $T_2=362$, $T_3=362$, $T_4=362$ for j=2, $T_1=493$, $T_2=418$, $T_3=279$, $T_4=98$ for j=3, $T_1=437$, $T_2=181$, $T_3=-181$, $T_4=-437$ for j=4, $T_1=383$, $T_2=-90$, $T_3=-452$, $T_4=-256$ for j=5, $T_1=317$, $T_2=-317$, $T_3=-317$, $T_4=317$ for j=6, $T_1=242$, $T_2=-427$, $T_3=85$, $T_4=362$ for j=7, $T_1=150$, $T_2=-362$, $T_3=362$, $T_4=-150$ for j=8, $T_1=72$, $T_2=-205$, $T_3=307$, $T_4=-362$ $Z_k$ (k=1, 2, 3, 4) in expression (4) is the sum or difference of two pieces of n-bit data $X_j$. Therefore, if difference of two pieces of n-bit data $X_j$. Therefore, if $Z_k$ is an n+1-bit number, and the bit at the bit position i of $Z_k$ is $Z_k(i)$, $Z_k$ may be represented by the following expression (5). Note that bit position i refers to the digit higher than the least significant bit by i−1 bits. For example, the bit at bit position 1 represents the least significant bit, and the bit at the bit position n+1 of $Z_k$ represents the most significant bit.

$$Z_k = \sum_{i=1}^{n+1} Z_k(i) \cdot 2^{i-1} \tag{5}$$

From expression (5), expression (4) may be represented by the following expression (6).

$$\begin{aligned} Y_j &= T_1 \sum_{i=1}^{n+1} Z_1(i) \cdot 2^{i-1} + T_2 \sum_{i=1}^{n+1} Z_2(i) \cdot 2^{i-1} + \\ &\quad T_3 \sum_{i=1}^{n+1} Z_3(i) \cdot 2^{i-1} + T_4 \sum_{i=1}^{n+1} Z_4(i) \cdot 2^{i-1} \\ &= \sum_{i=1}^{n+1} \{T_1 \cdot Z_1(i) + T_2 \cdot Z_2(i) + \\ &\quad T_3 \cdot Z_3(i) + T_4 \cdot Z_4(i)\} 2^{i-1} \end{aligned} \tag{6}$$

As shown in expression (4), $T_1$, $T_2$, $T_3$ and $T_4$ are fixed according to j. Therefore, it can be seen from expression (6) that $Y_j$ is a function of n+1 4-bit strings ($Z_1(1)Z_2(1)Z_3(1)Z_4(1)$), ($Z_1(2)Z_2(2)Z_3(2)Z_4(2)$), ..., ($Z_1(n+1)Z_2(n+1)Z_3(n+1)Z_4(n+1)$))

$T_1 \cdot (i) + T_2 \cdot Z_2(i) + T_3 \cdot Z_3(i) + T_4 \cdot Z_4(i)$ is defined as a partial sum of $Y_j$. Hereinafter, a partial sum of $Y_j$ having as an element the bit at the bit position 1 of $Z_k$, in other words $T_1 \cdot Z_1(1) + T_2 \cdot Z_2(1) + T_3 \cdot Z_3(1) + T_4 \cdot Z_4(1)$ is defined as a first partial sum of $Y_j$, a partial sum of $Y_j$ having as an element the bit at the bit position 2 of $Z_k$, in other words $T_1 \cdot Z_1(2) + T_2 \cdot Z_2(2) + T_3 \cdot Z3(2) + T_4 \cdot Z_4(2)$ as a second partial sum of $Y_j$, ..., and a partial sum of $Y_j$ having as an element the bit at the bit position n+1 of $Z_j$, in other words $T_1 \cdot Z_1(n+1) + T_2 \cdot Z_2(n+1) + T_3 \cdot Z_3(n+1) + T_4 \cdot Z_4(n+1)$ as an n+1 partial sum of $Y_j$.

Memories as many as the bit number of $Z_k$ (n+1) are provided, and each memory stores all the values the partial sum of $Y_j$ can take ($8 \times 2^4 = 128$ values). If each memory receives data indicating the value of j and a 4-bit string($Z_1(i)Z_2(i)Z_3(i)Z_4(i)$), it outputs a partial sum of $Y_j$ based on the input. Each memory is provided with data indicating the value of j, and outputs all the (n+1) 4-bit strings($Z_1(1)Z_2(1)Z_3(1)Z_4(1)$),($Z_1(2)Z_2(2)Z_3(2)Z_4(2)$), ..., ($Z_1(n+1)Z_2(n+1)Z_3(n+1)Z_4(n+1)$)) at the same bit positions of $Z_k$ to different memories. At that time, a partial sum output from each memory is shifted based on the bit positions of bits constituting the 4-bit string as the element in $Z_k$ as shown in expression (6) for addition, and $Y_j$ is produced.

Figure 4:
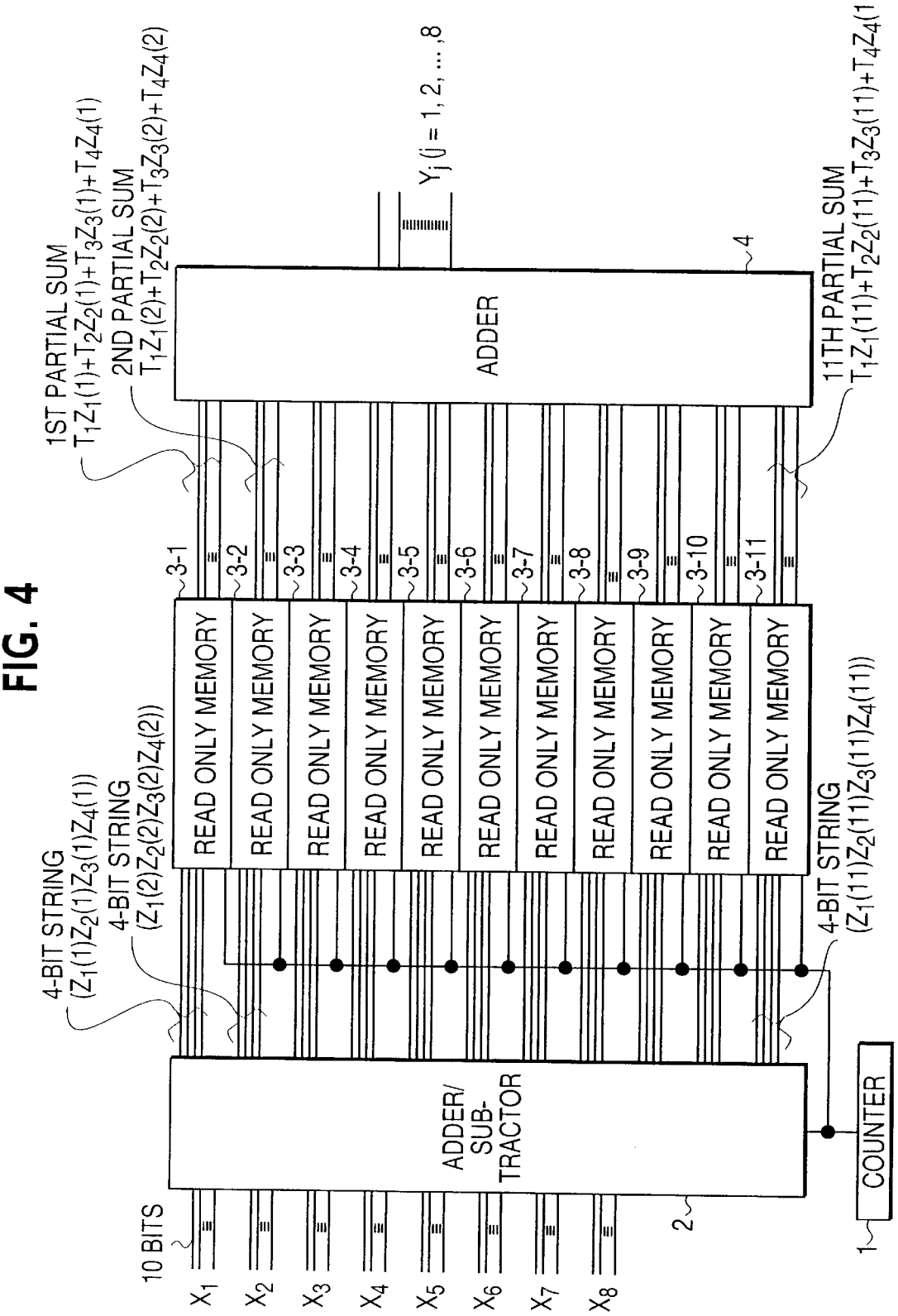
FIG. 4 is a block diagram showing the configuration of a one-dimensional 8-element discrete cosine transformer according to one embodiment of the invention.

Referring to FIG. 4, using the above-described method, the one-dimensional 8-element discrete cosine transformer outputting discrete cosine transformation coefficients $Y_1$, $Y_2$, ..., $Y_8$ based on 8 pieces of received input data $X_1$, $X_2$, ..., $X_8$ includes a counter 1 to output eight kinds of signals (corresponding to value j); an adder/subtracter 2 which receives 10-bit input data $X_1$, $X_2$, ..., $X_8$ and the output j of counter 1 and performs a prescribed addition/subtraction between the input data to produce $Z_1$ to $Z_4$, and to output eleven 4-bit strings ($Z_1(1)Z_2(1)Z_3(1)Z_4(1)$), ($Z_1(2)Z_2(2)Z_3(2)Z_4(2)$), ..., ($Z_1(11)Z_2(11)Z_3(11)Z_4(11)$); eleven read-only memories 3-1 to 3-11 which respectively receive the eleven 4-bit strings output from adder/subtracter 2 and output the first to eleventh partial sums of redundant binary code $Y_j$, respectively; and an adder 4 which receives the first to eleventh partial sums of redundant binary code $Y_j$, adds the respective partial sums after shifting them by a prescribed number of bits, converts the result into a binary representation, and outputs a discrete cosine transformation coefficient $Y_j$ (j=1, 2, ..., 8).

Adder 4 may be implemented using technology disclosed by T. Taniguchi et. al., "A High-Speed Floating-Point Processor using Redundant Binary Representation", Technical Report of IEICE (The Institute of Electronics, Information and Communication Engineers) ICD87-100 (1987) pp. 43–48. The thesis is herein incorporated by reference.

Now, the operation of each element will be described. The output of counter 1 (hereinafter referred to as "counter value") cyclically changes per prescribed time period and is formed of eight kinds of signals. If the eight kinds of signals are represented as a, b, c, d, e, f, g, and h, the counter value changes according to the order of a, b, c, d, e, f, g, h, a .... The counter value is applied to adder/subtracter 2 and memories 3-1, 3-2, ..., and 3-11.

Adder/subtracter 2 produces four pieces of data $Z_1$, $Z_2$, $Z_3$, and $Z_4$ based on received eight pieces of data $X_1$, $X_2$, ..., and $X_8$ input to the one-dimensional 8-element discrete cosine transformer. When the counter value is a, b, c or d, $Z_1 = X_1 + X_8$, $Z_2 = X_2 + X_7$, $Z_3 = X_3 + X_6$, and $Z_4 = X_4 + X_5$ hold, while if the counter value is e, f, g or h $Z_1 = X_1 − X_8$, $Z_2 = X_2 − X_7$, $Z_3 = X_3 − X_6$, and $Z_4 = X_4 − X_5$ hold. Note that $Z_1$, $Z_2$, $Z_3$, and $Z_4$ are each produced by single addition or subtraction among $X_1$, $X_2$, ..., $X_8$ each of which is 10-bit data, and therefore each will be 11-bit data.

$Z_1$, $Z_2$, $Z_3$ and $Z_4$ are divided on a bit-basis, and eleven sets of 4-bit strings $Z_1(i)$ $Z_2(i)$ $Z_3(i)$ $Z_4(i)$ (i=1–11) each formed of bits at the same bit positions of $Z_1$, $Z_2$, $Z_3$, and $Z_4$ are output from adder/subtracter 2. Among them, the one formed by bits at the bit positions 1 of $Z_1$, $Z_2$, $Z_3$ and $Z_4$, in other words ($Z_1(1)$ $Z_2(1)$ $Z_3(1)$ $Z_4(1)$) is applied to memory 3-1, the one formed of bits at the bit positions 2 of $Z_1$, $Z_2$, $Z_3$ and $Z_4$, in other words ($Z_1(2)$ $Z_2(2)$ $Z_3(2)$ $Z_4(2)$)) is applied to memory 3-2, ..., and the one formed of bits at the bit positions 11 of $Z_1$, $Z_2$, $Z_3$, and $Z_4$, in other words ($Z_1(11)$ $Z_2(11)$ $Z_3(11)$ $Z_4(11)$) is applied to memory 3-11.

Referring to FIG. 5, memories 3-1, 3-2, ..., 3-11 each output a value in a redundant binary code based on inputs, a counter value and a 4-bit string ($Z_1(i)$ $Z_2(i)$ $Z_3(i)$ $Z_4(i)$). More specifically, for the counter value of a, if the 4-bit string is (0000), 0 is output, if the 4-bit string is (0001), 362 is output, ..., and if the 4-bit string is (1111), 1448 is output. For the counter value of b, if the 4-bit string is (0000), 0 is output, if the 4-bit string is (0001), −437 is output, ..., if the 4-bit string is (1111), 0 is output. For the counter value of h, if the 4-bit string is (0000), 0 is output, if the 4-bit string is (0001), −362 is output, ..., and if the 4-bit string is (1111), −188 is output.

Thus, in view of the relation between the counter value and $Z_k$, the relation between the value of j in $Y_j$ and the value of coefficient $T_k$ in $Z_k$ in expression (4) and the bit position in $Z_k$ of each of bits constituting a 4-bit string to be input to each memory, if the counter value is a, memory 3-1 outputs a first partial sum of $Y_1$, memory 3-2 a second partial sum of $Y_1$, ..., and memory 3-11 an eleventh partial sum of $Y_1$. If the counter value is b, memory 3-1 outputs a first partial sum of $Y_3$, memory 3-2 a second partial sum of $Y_3$, ..., and memory 3-11 an eleventh partial sum of $Y_3$. If the counter value is c, memory 3-1 outputs a first partial sum of $Y_5$, memory 3-2 a second partial sum of $Y_5$, ..., and memory 3-11 an eleventh partial sum of $Y_5$. If the counter value is d, memory 3-1 outputs a first partial sum of $Y_7$, memory 3-2 a second partial sum of $Y_7$, ..., and memory 3-11 an eleventh partial sum of $Y_7$. If the counter value is e, memory 3-1 outputs a first partial sum of $Y_2$, memory 3-2 a second partial sum of $Y_2$, ..., and memory 3-11 an eleventh partial sum of $Y_2$. If the counter value is f, memory 3-1 outputs a first partial sum of $Y_4$, memory 3-2 a second partial sum of $Y_4$, ..., and memory 3-11 an eleventh partial sum of $Y_4$. If the counter value is g, memory 3-1 outputs a first partial sum of $Y_6$, memory 3-2 a second partial sum of $Y_6$, ..., and memory 3-11 an eleventh partial sum of $Y_6$. If the counter value is h, memory 3-1 outputs a first partial sum of $Y_8$, memory 3-2 a second partial sum of $Y_8$, ..., and memory 3-11 an eleventh partial sum of $Y_8$. Note that the number of bits output from each memory needs only to be not less than 22 in this case as will be described.

Adder 4 receives the partial sums output from memories 3-1, 3-2, ..., and 3-11, shifts the partial sum output from memory 3-2 to the position one bit higher, the partial sum output from memory 3-3 to the position 2 bits higher, ..., and the partial sum output from memory 3-11 to the position 10 bits higher, without shifting the one output from memory 3-1 and adds them up.

Thus, $Y_j$ will be produced by output of the first to eleventh partial sums of $Y_j$ from memories 3-1, 3-2, ..., 3-11, respectively as described above, and based on the relation between $Y_j$ in expression (6) and its partial sums. Note that adder 4 rounds off the result of addition, in other words $Y_j$ into a prescribed number of bits if necessary. Furthermore, in this one-dimensional 8-element discrete cosine transformer, based on the relation between the input and output of each memory shown in FIG. 4 and the way the counter value changes as described above, $Y_j$ will be produced sequentially according to the order of $Y_1$, $Y_3$, $Y_5$, $Y_7$, $Y_2$, $Y_4$, $Y_6$, and $Y_8$.

Referring to FIG. 5, memories 3-1 to 3-11 each output a value in a redundant binary code produced by encoding a redundant binary representation by a 2-bit string. Let us now assume that the 4-bit string input to a memory is (0101) and the counter value is a. In this case, the output value of each memory is 724, and therefore a value produced by encoding "010-100-10-1-100", i.e., one redundant binary representation by a 2-bit string is output from each memory. If, for example, the method of encoding the redundant binary representation by a 2-bit string is according to definition 3 shown in FIG. 2, the output value is (000100100000100010100000).

In order to permit a memory to output a value in a redundant binary code, a value should be previously converted into a redundant binary representation for storage. As described above, there are a number of redundant binary representations for a single numerical value. Therefore, one representation should be selected from them, which will be described. In the one-dimensional 8-element discrete cosine transformer according to this embodiment, while the counter value changes according to the order of a, b, c, and d, and the order of e, f, g and h, $Z_k$ does not change. Therefore, the 4-bit strings input to the memories do not change during these periods. Among the four output values when the counter value is a, b, c, and d, the output order of these values is fixed.

Similarly, among the four output values when the counter value is e, f, g, and h, the output order of these values is fixed. Therefore, in view of reducing the number of transitions, the redundant binary representation of each output value (along with the method of encoding the redundant binary representation) may be selected so that the number of changes in digits between redundant binary representations at the time of sequentially outputting these four values is minimized.

Referring to FIG. 6A, the output value of a memory for an input-4-bit string of (0101) is 724, −256, 0 and −512 when the counter value is a, b, c, and d, respectively. Therefore, "010-100-10-1-100" is selected for the redundant binary representation of 724, "000-100000000" for the redundant binary representation of 256, "00-1000000000" for the redundant binary representation of −512 (the redundant binary representation of 0 is "000000000000"). Thus the number of transitions in a single memory is 6 at a minimum during the period in which the counter value changes according to the order of a, b, c to d.

Referring to FIG. 6B, the output value of a memory for an input 4-bit string of (0011) is 377, −708, 447, and −55, when the counter value is e, f, g, and h, respectively. Therefore, "0010-10000-1-1-1" is selected for the redundant binary representation of 377, "0-110-1-1000-100" for the redundant binary representation of −708, "00100-100000-1" for the redundant binary representation of 447, and "00000-100101-1" for the redundant binary representation of −55. Thus the number of transitions in a single memory during the period in which the counter value changes according to the order of e, f, g and h is minimized to 11. Note that definition 3 in FIG. 2 is employed as a method of encoding a redundant binary representation.

Referring to FIG. 6C, in these two examples, the number of transitions in a single memory during the period in which the counter value changes from d to e is 6. Therefore, the number of transitions in a certain memory during the period since the one-dimensional 8-element discrete cosine transformer receives 8 pieces of data $X_1$, $X_2$, ..., and $X_8$ until it outputs eight discrete cosine transform coefficients $Y_1$, $Y_2$, ..., and $Y_8$ (hereinafter referred to as "total transition time") is 6+11+6=23 provided that the counter value is a, b, c and d and the input 4-bit string is (0101) or that the counter value is e, f, g and h and the input 4-bit string is (0011).

Thus, based on four output values when the counter value is a, b, c and d for each input 4-bit string to a memory and their output order and based on four output values when the counter value is e, f, g and h and their output order, redundant binary representations are selected for all the 128 output values stored by the memories.

Now, for the purpose of comparison, the number of transitions in a single memory when a value is output from the memory in a conventional binary representation is calculated. Referring to FIG. 7A, if the counter value is a, b, c and d and the 4-bit string is (0101), the number of transitions during the period in which the counter value changes according to the order of a, b, c, and d is 14.

Referring to FIG. 7B, if the counter value is e, f, g, and h and the 4-bit string is (0011), the number of transitions during the period in which the counter value changes according to the order of e, f, g, and h is 18.

Referring to FIG. 7C, the number of transitions during the period in which the counter value changes from d to e is 9. Therefore, if the counter value is a, b, c and d and the 4-bit string is (0101), and if the counter value is e, f, g and h and the 4-bit string is (0011), the total transition number is 14+18+9=41.

Referring to FIGS. 6A to 6C, in the above example, the redundant binary representation of an output value from a memory is in 12 digits. Since a redundant binary code (produced by encoding a redundant binary representation by a 2-bit string) is output from the memory, the bit number of the output value from the memory is 12 digits×2=24 bits. Meanwhile, in an n-digit redundant binary representation, a numerical value in the range from $-2^{n+1}$ to $2^{n-1}$ may be expressed. Referring to FIG. 5, in the one-dimensional 8-element discrete cosine transformer according to this embodiment, the output value of the memory is in the range from −798 to 1448. All the output values of the memory may be expressed in an eleven-digit-redundant binary representation, and therefore the bit number of the output value may be 11 digits×2=22 bits. Conversely, the output bit number of the memory may be larger than 24. Thus, the number of digits in a redundant binary representation is increased, in other words a single numerical values may be represented in a larger number of states, and therefore the number of transitions may be further reduced. As a result, in the one-dimensional 8-element discrete cosine transformer, it is only necessary to secure 22 bits or more for the output bit number from the memory.

Note that in an n-digit binary representation, a numerical value in the range from $-2^{n-1}$ to $2^{n-1}-1$ may be represented, wherein a negative number is represented in the two's complement. Meanwhile, the n−1-digit redundant binary representation, a numerical value in the range from $-2^{n-1}+1$ to $2^{n-1}-1$ may be expressed. Thus, the only numerical value which can be expressed in the n-digit binary representation but cannot be expressed in the n−1 digit redundant binary representation is $-2^{n-1}$. Therefore, almost all the n-digit binary representation may be replaced by n−1-digit redundant binary representations. Accordingly, if a value is output from a memory in a binary representation and the number of bits of the output of the memory is not less than n bits, the output bit number of the memory may be set to be not less than (n−1)×2=2n−2, in order to output the value from the memory in the form of redundant binary code.

Referring to FIG. 8, values in boxes under "transition number" are the numbers of transitions during the period in which the counter value changes according to the order of a, b, c, and d when a memory receives a certain input 4-bit string, and the total is given in the undermost box. Note that the input 4-bit string is given in the left of these boxes.

Values in boxes in the right of "transition number" are transition numbers during the period in which the counter value changes according to the order of e, f, g, and h when a memory receives a certain input 4-bit string, and the total is given in the rightmost box. The input 4-bit string is given above these boxes.

Values in boxes under and in the right of these two lines of boxes are the numbers of transitions during the period in which the counter value changes from d to e if, for the counter values of a, b, c and d, the input 4-bit strings are those given in the leftmost boxes, and for the counter values of e, f, g and h, the input 4-bit strings are those given in the uppermost boxes, and the total is given in the lowermost and rightmost corner of the figure.

During the period since the one-dimensional 8-element discrete cosine transformer receives 8 pieces of input data $X_1, X_2, \ldots,$ and $X_8$ until eight discrete cosine transform coefficients $Y_1, Y_2, \ldots,$ and $Y_8$ are output, there are 16 kinds of input 4-bit strings where the counter value is a, b, c and d, and there are 16 kinds of input 4-bit strings where the counter value is e, f, g and h. Therefore, there may be 16×16=256 patterns for the input 4-bit string, and the total of total transition numbers in these patterns is 166×16+180×16+1574=7110. The total of the total transition number divided by the number of patterns (256) (hereinafter referred to as "average total transition number") is 27.77, which value serves as an index for a total transition number if each pattern is generated with the same probability.

Note that for comparison, if a value is output from a memory in a conventional binary representation, the number of transitions during the period in which the counter value changes according to the order of a, b, c and d in a single memory and the number of transitions during the period the counter value changes from d to e in a single memory are produced for all the input 4-bit strings and the result is given in FIG. 9. Numerical values in boxes corresponding to FIG. 8 represent the same contents, and the total of the total transition numbers is 244×16+272×16+1442=9698, and the average total transition number is 9698÷256≈37.88.

As a result, in the one-dimensional 8-element discrete cosine transformer, in place of outputting a value from the memory in binary representation, outputting the value in the form of a redundant binary code may reduce the average total transition number by about 26.7% from 37.88 to 27.77.

As in the foregoing, according to the one-dimensional 8-element discrete cosine transformer according to this embodiment, the transition number may be reduced as compared to the case of providing a memory which outputs a value in binary representation, the power consumption by the memory is reduced as well, and the life of the discrete cosine transformer may be advantageously prolonged.

Although the one-dimensional 8-element discrete cosine transformer is described as the embodiment of the arithmetic unit according to the invention, the invention is by no means limited to such arithmetic unit. The invention is applicable to any arithmetic unit which uses the output data of a memory in the process of an arithmetic operation, and has determined output data to use at least before or after each output data of the memory.

The present invention could be similarly advantageously applied to an arithmetic unit in which data to be used before or after using partial output data of the memory is determined.

In the above embodiment, the 2-bit string is used for encoding a redundant binary representation, a bit string including a larger number of bits may be used if necessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory device, comprising:
   a redundant binary code memory portion for storing redundant binary codes in association with binary representation of digits of input data, each of the codes including multi-bit strings; and
   a redundant binary code output portion for outputting a stored redundant binary code in response to input of data.

2. The memory device as recited in claim 1, wherein said redundant binary code memory portion stores a redundant binary code obtained by replacing each digit of said input data in a redundant binary representation, with a separate 2-bit string allocated to a value corresponding to the digit.

3. An arithmetic unit, comprising:
   a memory; and
   a circuit for performing a prescribed operation on an output value received from said memory,
   said memory including, a redundant binary code memory portion for storing redundant binary codes in association with binary representations of digits of input data, each of the codes including multi-bit strings, and a redundant binary code output portion for outputting a stored redundant binary code in response to input of data.

4. An arithmetic unit as recited in claim 3, wherein
   said redundant binary code memory portion stores a redundant binary code obtained by replacing each digit of said input data in a redundant binary representation, with a separate 2-bit string allocated to a value corresponding to the digit.

5. The arithmetic unit of claim 3, wherein the circuit is an adder.

6. The arithmetic unit of claim 3, wherein the circuit is comparator.

7. The arithmetic unit of claim 3, wherein the circuit is a multiplier.

8. A discrete cosine transformer, comprising:

a counter for sequentially generating a signal for selecting a discrete cosine transformation coefficient;

an adder/subtracter for producing a plurality of added/subtracted values according to a prescribed rule based on an output received from said counter and a plurality of received data items, and for outputting a plurality of bit strings at bit positions of said plurality of added/subtracted values;

a plurality of memories, each receiving the output of said counter and respectively receiving said plurality of bit strings output from said adder/subtracter, for outputting a plurality of partial sums of a redundant binary code; and an adder connected to said plurality of memories for shifting each of said plurality of partial sums by a prescribed bit number, and then adding the shifted partial sums, said plurality of memories each including, a redundant binary code memory for storing said redundant binary code in association with a redundant binary representation of the counter output, including a multi-bit string, and a redundant binary code output portion for receiving the output of said counter and the output of said adder/subtracter and for outputting said partial redundant binary code.

9. A discrete cosine transformer as recited in claim 8, wherein said redundant binary code memory portion stores a redundant binary code as a separate 2-bit string.

* * * * *